United States Patent
Yashpal et al.

(10) Patent No.: US 8,799,402 B2
(45) Date of Patent: Aug. 5, 2014

(54) CONTENT SHARING VIA MOBILE BROADCAST SYSTEM AND METHOD

(75) Inventors: Vikram Yashpal, Carlsbad, CA (US); John Elliott, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 282 days.

(21) Appl. No.: 11/771,706

(22) Filed: Jun. 29, 2007

(65) Prior Publication Data

US 2009/0006536 A1    Jan. 1, 2009

(51) Int. Cl.
 *G06F 15/16* (2006.01)

(52) U.S. Cl.
 USPC ............................ 709/217; 709/218; 709/219

(58) Field of Classification Search
 USPC .......................................... 709/217, 218, 219
 See application file for complete search history.

(56) References Cited

U.S. PATENT DOCUMENTS

| | | | | |
|---|---|---|---|---|
| 5,418,937 | A * | 5/1995 | Inoue ........................... | 714/47.3 |
| 5,561,637 | A * | 10/1996 | Dan et al. .................. | 365/230.03 |
| 6,044,265 | A | 3/2000 | Roach, Jr. | |
| 7,012,960 | B2 * | 3/2006 | Bourge et al. ............. | 375/240.12 |
| 2002/0065035 | A1 * | 5/2002 | Koshino ........................ | 455/3.01 |
| 2003/0191659 | A1 * | 10/2003 | Okita et al. ......................... | 705/1 |
| 2004/0131187 | A1 * | 7/2004 | Takao et al. ................... | 380/255 |
| 2005/0044142 | A1 * | 2/2005 | Garrec et al. ................. | 709/204 |
| 2006/0268792 | A1 | 11/2006 | Belcea | |
| 2006/0294561 | A1 * | 12/2006 | Grannan et al. .............. | 725/101 |
| 2007/0019645 | A1 * | 1/2007 | Menon .......................... | 370/390 |
| 2007/0195724 | A1 * | 8/2007 | Yang et al. .................... | 370/321 |
| 2007/0242634 | A1 * | 10/2007 | Calcev et al. ................. | 370/318 |
| 2007/0298708 | A1 * | 12/2007 | Maggenti et al. ............ | 455/3.01 |
| 2008/0200125 | A1 * | 8/2008 | Caldwell et al. ................ | 455/42 |
| 2008/0225995 | A1 * | 9/2008 | Auranen et al. .............. | 375/344 |
| 2008/0242290 | A1 * | 10/2008 | Bhatia et al. ............... | 455/422.1 |
| 2009/0003329 | A1 * | 1/2009 | Murakami et al. ............ | 370/389 |
| 2009/0163189 | A1 * | 6/2009 | Gil et al. .................... | 455/414.3 |
| 2009/0221307 | A1 * | 9/2009 | Wolak et al. ................. | 455/466 |
| 2009/0222855 | A1 * | 9/2009 | Vare et al. ....................... | 725/39 |
| 2010/0165902 | A1 * | 7/2010 | Kvernvik et al. ............. | 370/312 |
| 2011/0107369 | A1 * | 5/2011 | O'Brien et al. ................. | 725/38 |
| 2011/0206020 | A1 * | 8/2011 | Hollick et al. ................ | 370/337 |

FOREIGN PATENT DOCUMENTS

| | | |
|---|---|---|
| EP | 1798928 | 6/2007 |
| GB | 2405555 | 3/2005 |
| WO | 0147301 | 6/2001 |
| WO | 2007014359 | 2/2007 |
| WO | 2007149821 | 12/2007 |

OTHER PUBLICATIONS

International Search Report—PCT/US08/088798—International Search Authority, European Patent Office—Oct. 20, 2008.
Written Opinion—PCT/US08/068798—International Search Authority, European Patent Office—Oct. 20, 2008.
International Preliminary Report on Patentability, PCT/US2008/068798, International Preliminary Examining Authority, European Patent Office, Sep. 9, 2009.

* cited by examiner

*Primary Examiner* — Thanh Tammy Nguyen
*Assistant Examiner* — Jonathan Bui
(74) *Attorney, Agent, or Firm* — Fulbright & Jaworski LLP

(57) ABSTRACT

A method for sharing data content is provided. The method includes aggregating requests to share data content across broadcast networks and re-broadcasting the data content based at least in part on the number of requests or a determined capacity of the broadcast networks.

11 Claims, 17 Drawing Sheets

CONTENT SHARING VIA MOBILE BROADCAST SYSTEM AND METHOD

TECHNICAL FIELD

The following description relates generally to communications systems, and more particularly to creating personalized networks for a community from a set of broadcast channels.

BACKGROUND

Communication networks, such as wireless communication networks, broadband networks, and other suitable networks are utilized in connection with transferring data, wherein data can include word processing files, streaming video, multimedia files, voice data, and/or the like. Other networks such as the Internet provide similar data capabilities where substantially any type of data can be transferred between users. Generally, communications between parties are established across such networks in a peer-to-peer manner. Thus, if one user wants to communicate data to one or more other users, the user packages the data (such as in an e-mail), determines who the other users are to receive the package, defines their respective e-mail addresses, and then sends the package to the other users. Similarly, if a text message were to be transmitted from a cell phone, the user would then dial another phone and send the text message via peer-to-peer principles. In an Internet context, this may include transferring and sharing video or other type media between Internet peers.

A peer-to-peer (or "P2P") computer network relies primarily on the computing power and bandwidth of the participants in the network rather than concentrating it in relatively few servers. Peer-to-peer networks are typically used for connecting nodes via largely ad hoc connections. Such networks are useful for many purposes. Common uses include sharing content files containing audio, video, data or other media in digital format as well as real time data, such as telephony traffic.

A pure peer-to-peer network generally does not employ the notion of clients or servers, yet even in the client/Server environment—sharing of content can entail sending content from the sender-client to the server and then offering it (pull or push) to the recipient client. Typically, equal peer nodes that simultaneously function as both "clients" and "servers" to the other nodes on the network facilitate peer-to-peer exchanges. This model of network arrangement differs from the client-server model where communication is usually to and from a central server. A typical example for a non peer-to-peer file transfer is an FTP server where the client and server programs are quite distinct, and the clients initiate the download/uploads and the servers react to and satisfy these requests.

Peer-to-peer architecture embodies one of the key technical concepts of the Internet. More recently, the concept has achieved recognition in the general public in the context of the absence of central indexing servers in architectures used for exchanging multimedia files. One of the major drawbacks of peer-to-peer exchanges is the requirement for large bandwidth to communicate data between an ever growing number of users. As these bandwidth pressures increase, there is a need to exchange data between users while mitigating peer-to-peer exchanges and relieving pressures on components, such as centralized servers, to facilitate such data exchange.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its sole purpose is to present some concepts in a simplified form as a prelude to the more detailed description that is presented later.

Community based networking is provided using available broadcast channels while mitigating peer-to-peer data exchanges and reducing broadcast requirements of media distribution servers. In an embodiment, content sharing is facilitated between members of a community, where requests to share content are received by an aggregator. Such content could be a request generated by the community to share a video clip from an available broadcast channel, for example. Rather than merely transmitting the requested content to each member of the community upon individual request, the aggregator analyzes the number of requests and determines system capacity requirements. If the number of requests exceeds designated thresholds, the content can be broadcast to members of the community during times that are more optimally suited for the overall system such as during times that loading on the system are minimal. In this manner, the system transmits data according to needs of the community and broadcast capabilities in order to mitigate overall data transmission requirements.

In another embodiment, tags can be employed to identify community based networks where the networks are identified from a set of available broadcast channels. Data in the tags (or associated therewith) can be communicated as metadata to indicate some aspect of an identified or defined community network that is composed from channels of the broadcast network. For example, one user may create a tag that identifies a network (public or private) of channels related to a given topic or theme. The user then invites members of the community who may then be a party to the defined private network. When other members receive a broadcast of the identified channel, the attached metadata from the tags is cached locally and subsequently available for viewing during the time the broadcast is received by the network members. Generally, related tags are broadcast along with other programs in the channel. The receiving device (with the help of locally cached tags related to the network of channels) aggregates the broadcast programs by comparing them with the locally cached channel tags. Thus, the device filters available programs to pick up programs which will make up the community based network channel. Rather than peer-to-peer exchanges, the tags facilitate identifying content that may be of interest to the identified community yet conserve bandwidth since only the related metadata is transmitted to the members of the community as opposed to the underlying content of the respective channel which is received over the broadcast medium.

To accomplish the foregoing and related ends, certain illustrative aspects are presented herein in connection with the following description and the annexed drawings. These aspects are indicative, however, of but a few of the various ways in which the principles of the claimed subject matter may be employed and the claimed subject matter is intended to include all such aspects and their equivalents. Other advantages and novel features may become apparent from the following detailed description when considered in conjunction with the drawings.

BRIEF DESCRIPTION OF THE DRAWINGS

FIG. 6 illustrates an example format for a subscriber service set.

DETAILED DESCRIPTION

Systems and methods are provided to facilitate communications in a community network. In an embodiment, a method for sharing data content is provided. The method includes aggregating requests to share data content across broadcast networks and broadcasting the data content based at least in part on the number of requests or a determined capacity of the broadcast networks. In another embodiment, a method for creating community channels is provided. The method includes defining a subset of channels from a broadcast network, associating one or more tags with the channels, defining programs with one or more tags, and employing the tags to enable a community network from the broadcast network.

Furthermore, various aspects are described herein in connection with a terminal. A terminal can also be a system, a user device, a subscriber unit, subscriber station, mobile station, mobile device, remote station, remote terminal, access terminal, user terminal, user agent, or user equipment. A user device can be a cellular telephone, a cordless telephone, a Session Initiation Protocol (SIP) phone, a wireless local loop (WLL) station, a PDA, a handheld device having wireless connection capability, a module within a terminal, a card that can be attached to or integrated within a host device (e.g., a PCMCIA card) or other processing device connected to a wireless modem.

Moreover, aspects of the claimed subject matter may be implemented as a method, apparatus, or article of manufacture using standard programming and/or engineering techniques to produce software, firmware, hardware, or any combination thereof to control a computer or computing components to implement various aspects of the claimed subject matter. The term "article of manufacture" as used herein is intended to encompass a computer program accessible from any computer-readable device, carrier, or media. For example, computer readable media can include but are not limited to magnetic storage devices (e.g. hard disk, floppy disk, magnetic strips), optical disks (e.g., compact disk (CD), digital versatile disk (DVD)), smart cards, and flash memory devices (e.g., card, stick, key drive). Additionally it should be appreciated that a carrier wave can be employed to carry computer-readable electronic data such as those used in transmitting and receiving voice mail or in accessing a network such as a cellular network. Of course, those skilled in the art will recognize many modifications may be made to this configuration without departing from the scope or spirit of what is described herein.

Figure 1:
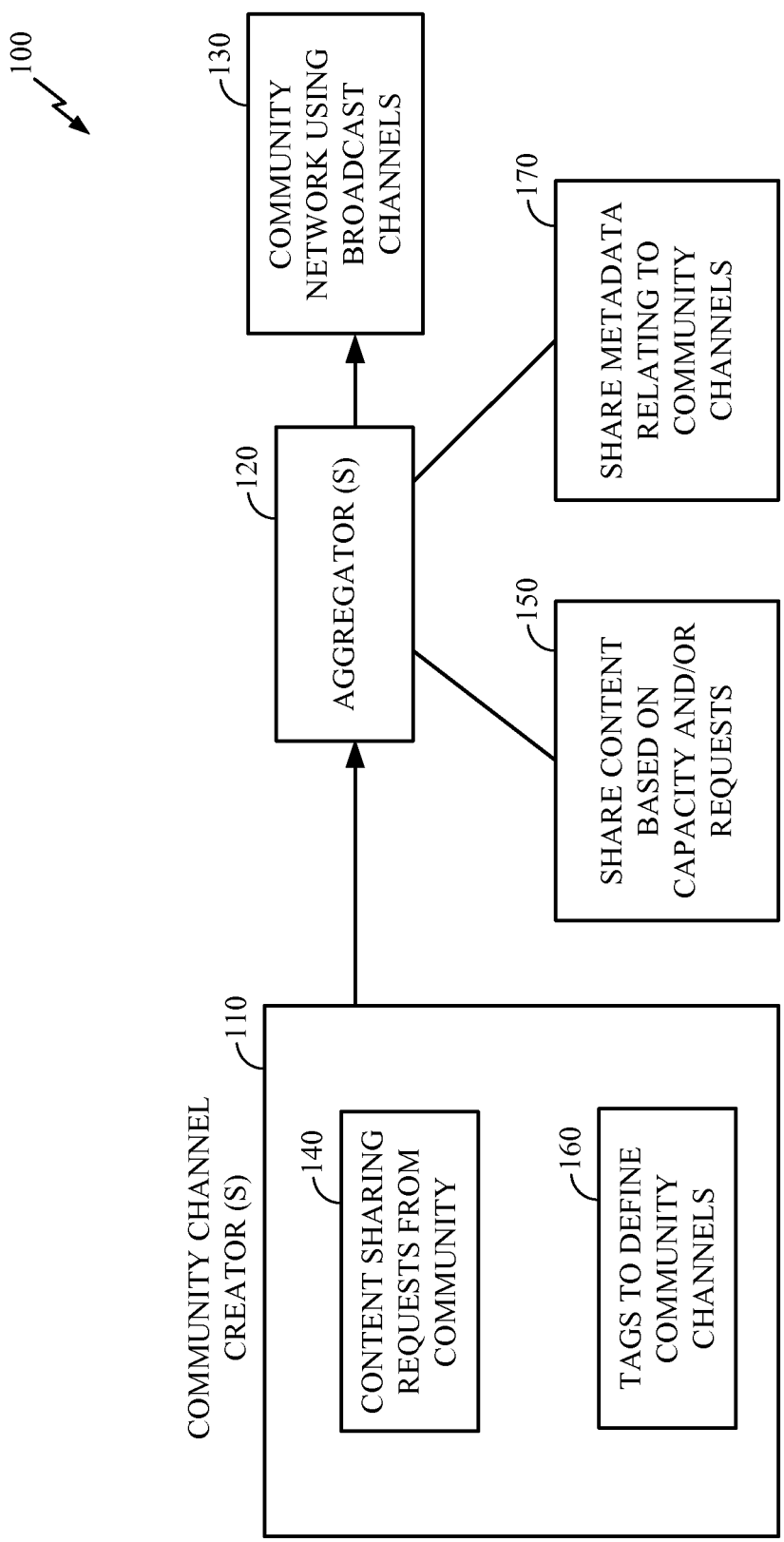
FIG. 1 is a high level block diagram of a community based network that employs broadcast channels for communications.

Referring now to FIG. 1, a system 100 illustrates a community based network that employs broadcast channels for communications. The system 100 includes a community channel creator 110 (also referred to as creator) that can be substantially any type of device such as a cell phone, personal digital assistant, computer, and so forth. The creator 110 communicates with one or more aggregators 120 that are employed to facilitate communications with a community network 130, where the community network is defined, created, or identified from available broadcasting channels. As shown, the creator 110 can initiate requests for content sharing 140 that are processed by the aggregator 120 and provided to the members of the community network 130. The aggregator 120 can thus share content 150 at times that are most suitable for the overall system 100 and in view of the members of the community network 130. For example, content requests 140 may arrive from several members who are requesting that a broadcast packet be sent to other members of a group. Based on the number of requests and in view of system capacity, the aggregator 120 can broadcast the requested content 150 to the community network 130. This is in contrast to prior methods which receive requests and respond by repeatedly broadcasting the requested content to each member, which wastes bandwidth. Also in another embodiment, the creator 110 employs one or more tags 160 to define community channels for the community network 130. The tags 160 facilitate communicating metadata 170 that can be used to communicate amongst members of the community network 130. Some of the tags 160 can be chosen from existing program data or created by alternate methods e.g., from an email, short message service (SMS), or selected automatically by pre-defined rules.

In general, community based networking is provided using available broadcast channels (e.g., Sports, Weather, News, Entertainment, and so forth) while mitigating peer-to-peer data exchanges and reducing broadcast requirements of data exchange servers. In an embodiment, content sharing is facilitated between members of the community network 130, where requests 140 to share content are received by the aggregator 120. Such content 150 could be a video clip from an available broadcast channel, for example. Rather than merely transmitting the requested content to each member of the community network 130 in response to individual request, the aggregator 120 analyzes the number of requests and determines system capacity requirements. If the number of requests exceeds designated thresholds (or alternatively satisfies a pre-determined condition or by manual intervention), the content 150 can be broadcast to members of the community network 130 during times that are better suited for the overall system 100 such as during times that loading on the system are minimal. In this manner, the system 100 transmits data according to needs and broadcast capabilities of the community network 130 in order to mitigate overall data transmission requirements.

In another embodiment, the tags 160 can be employed to identify community based networks where the networks are identified from a set of available broadcast channels. Data in the tags 160 (or associated therewith) can be communicated as metadata 170 to indicate some aspect of an identified or defined network that is composed from channels of the broadcast network. For example, one user may create a tag 160 that identifies a private network of channels related to a given topic or theme. The user then invites members of the community network 130 become a party to the defined private network. When other members receive a broadcast of the identified channel, the attached metadata 170 from the tags 160 is cached locally and subsequently made available for viewing during the times the broadcast is received by the network members. Rather than peer-to-peer or client/server exchanges, the tags 160 facilitate identifying content that may be of interest to the identified community yet conserve bandwidth since only the related metadata is transmitted to the members of the community network 130 as opposed to the underlying content of the respective channel which is received over the broadcast medium. Note that the tags 160 can be employed to communicate additional data for members or can be employed as an enabling component. For instance, a tag could be sent from one member of a community to another to enable the other member to receive a subscription service for a designated time.

With respect to content sharing 150, users can share any content with their community channel network 130 by sending a request 140 to the aggregators 120 which function as a media distribution system or servers (e.g., Forward Link Only (FLO) servers). The media distribution system receives the share requests 140 across community channel members 130. The system decides to re-broadcast a program during an optimized time based on the available capacity on the FLO network, number of channel subscribers/requests, and so forth. The program is then rebroadcast at the optimized time potentially by utilizing residual bandwidth as a result of statistical multiplexer gains, for example. The shared program information is displayed on the program guide of the community channel members as will be describe described in more detail below.

With respect to tags 160, mobile broadcast users can create community channels 130 by reference to tags 160. Specifically, users can create these community channels using catchcasting tags 160 (i.e., client filters). Users can create their own tags 160 for the community channel and configure these community channels as private or public. Users can invite their contacts to join the community channel, where invitees can subscribe to a relevant service to join the community channels. As can be appreciated, many community channels can be created by employing the above methods. In one embodiment, sharing of a community channel is a paid subscription event for users. The sharing of the community channels (or sharing filters) with contacts enables users to have a common experience within a community. For instance, a community channel identifier is displayed on a member's program guide (see interfaces below in FIGS. 3-6), where community channel (tag-identified) programming is provided by way of the community channel. A community channel member can participate in the following example activities related to the community channel: View common programming based on shared filters; Share a program (from another channel) with the community; and Discuss a program with the community. Users can search public community channels based on their interests and join these community channels by subscribing to these public channels. Typically, users can join a private community channel by invitation only.

Figure 2:
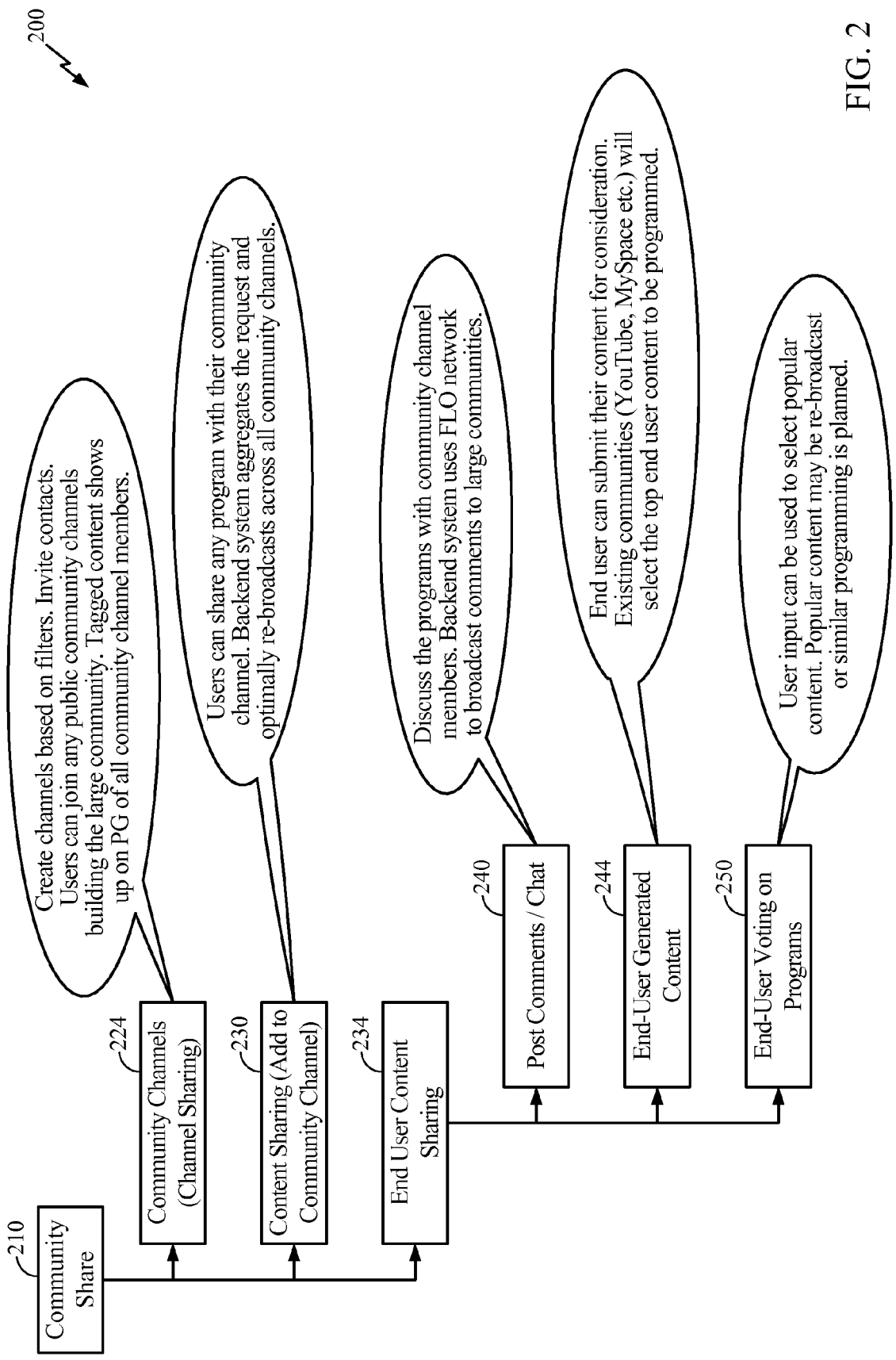
FIG. 2 is a diagram of network data sharing and tagging examples.

Referring now to FIG. 2, network data sharing and tagging examples 200 are illustrated. A tree 200 of examples is shown that outlines various community data sharing examples 210. This can include sharing community channels 224 and sharing specific content 230. Another node 234 relates to end user content sharing, which is associated with the tagging concepts described above. End user content sharing 234 can include posting comments 240 to community members across defined networks, allowing end user generated content at 244, and facilitating aspects such as enabling end user voting schemes 250 for broadcast channels among other data that can be shared in the community.

With respect to community channels 224, users can create channels based on filters, where contacts are invited and users can join any public community channels to build the larger community. Tagged content shows up on a viewer interface of the community channel members. With respect to content sharing 230, users can share specific programs with their community channels based on requests from the community. Backend systems can then aggregate the requests and optimally rebroadcast across the community channels according to differing factors such as the number of requests or system load.

For end user content sharing 234, posting comments or chatting 240 allows users to discuss the defined programs with other community channel members. Backend systems use a forward link only (FLO) network (or substantially any broadcast network), for example, to broadcast comments to larger communities. For end user generated comments 244, end users can submit their content for consideration. Thus, existing communities (e.g., YouTube, MySpace and so forth) can select the top end user content to be programmed. For voting 250, user input can be used to select popular content. Popular content may then be rebroadcast or similar programming can be planned.

Now referring to FIG. 3-6 collectively, example interfaces are shown which facilitate the community based sharing principles described above. It is to be appreciated that the interfaces shown are but one of many possible interface configurations, where other interfaces can be employed to configure various different channels in addition to the examples so illustrated.

Figure 3:
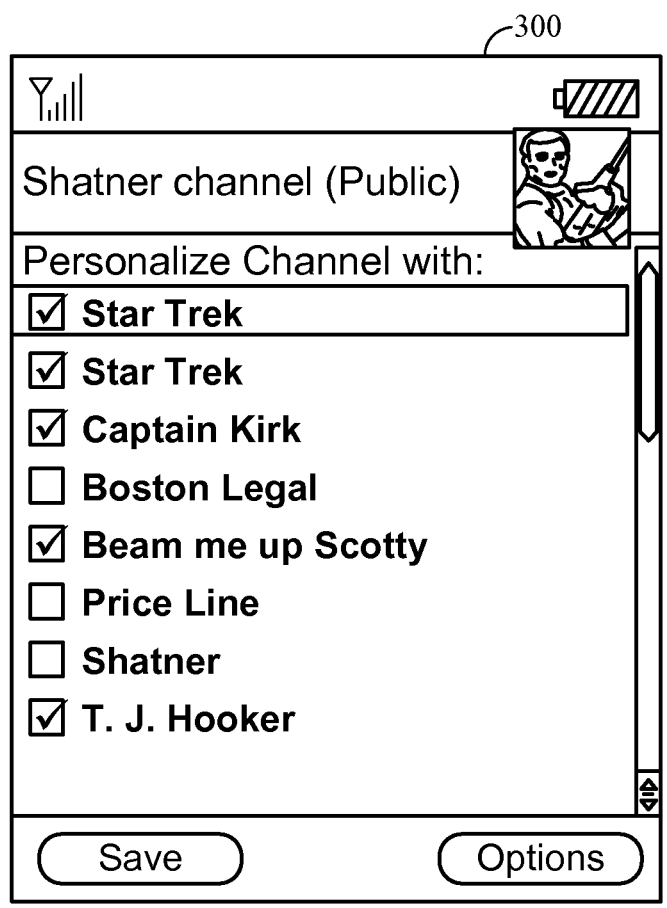
FIGS. 3-6 illustrate example interfaces for configuring community networks and communicating with the respective networks.

FIG. 3 illustrates an interface 300 to create a community channel. In this particular channel, a "Shatner" channel is created relating to programs associated with the actor having the name "Shatner." It is to be appreciated that substantially any topic or theme may be employed when creating a channel. The interface 300 can be employed as a mobile user interface such as on a cell phone for example to create community channels. In this example, tags are created and attach to the channel. Some of these tags in this example include "Boston Legal", "Captain Kirk", and "Price Line." Other new tags can be created as desired. After the tags have been created, the channel is published as public or private via interface 300 buttons and options control. After creating the channel, friends are invited to the community as illustrated in FIG. 4.

Figure 4:
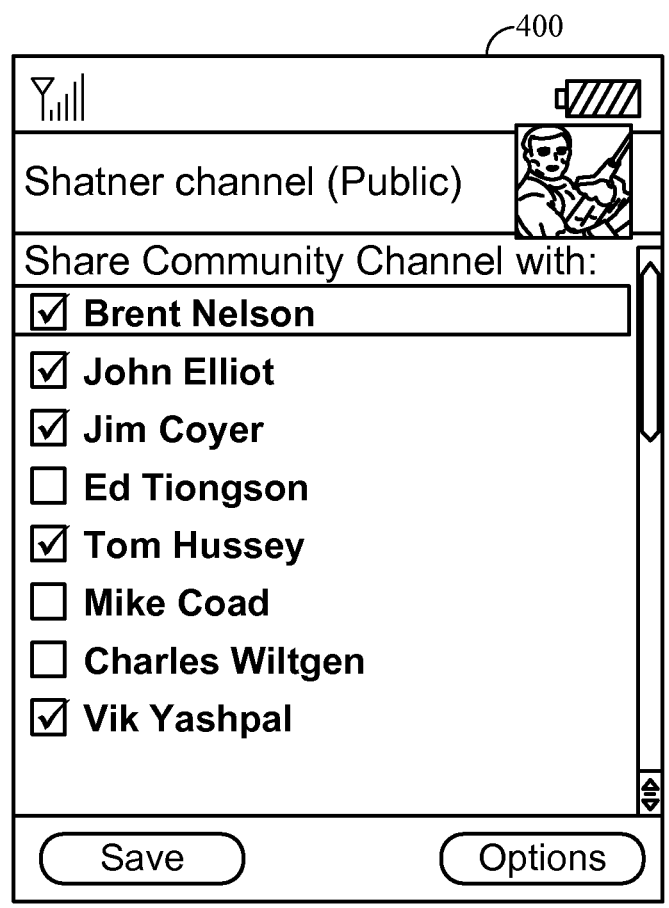

FIG. 4 illustrates an example interface 400 for inviting friends to the channel created above with reference to FIG. 3. After creating a community channel, users can invite friends via an interface 400. An invitation message can be received by users indicated by the interface, where users providing a list of other users can accept the invitation and start to share the community channel. In one embodiment, an invitee is a forward link only user (or other broadcast medium) and is a relevant content subscriber who has access to the programming on the community channel. Users can be invited to many community channels, as may be appreciated. In this example, after inviting members, an interface such as illustrated in FIG. 5 is displayed for receiving and selecting shared content.

Figure 5:
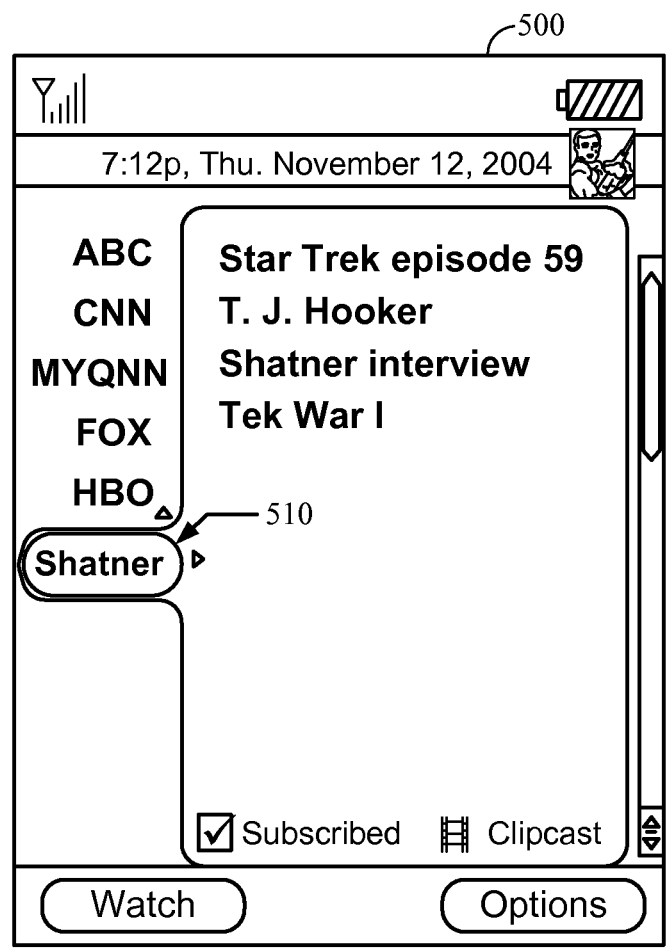

Now referring to FIG. 5, an interface 500 allows for the provision of a common experience for members belonging to the created channel. As shown, a community channel 510 appears on a program guide of the members. Generally, all community channel (tag-identified) programming appears on the program guide. In this example, tag-identified content is Star Trek episode 59, T. J. Hooker, Shatner Interview, and TekWar. A community channel member can participate in at least the following example activities related to the community channel: View the common programming based on shared filters; Discuss a program with the community; and Share a program (from another channel) with the community. As may be appreciated, other data sharing experiences can be provided and facilitated.

Figure 6:
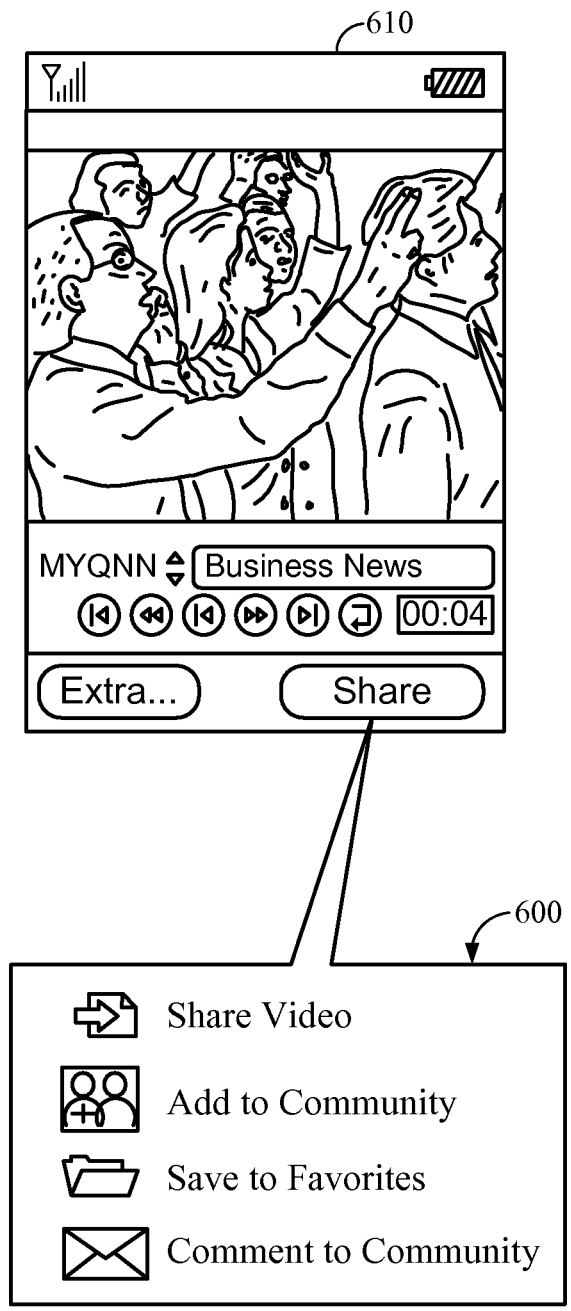

FIG. 6 illustrates some data content sharing examples that are enabled from the interfaces described above in other embodiments. An "options" listing 600 provides options such as sharing a video (or other media), adding members to a community, saving favorites to a file, and adding comments to a community. As shown, an example video snippet 610 has been selected for sharing. Content sharing can occur over 3G networks, in one example. Programs can be shared with a community by adding them to the respective community channels. By creating tags, comments regarding respective programs can be shared. In one embodiment, when content is received, it is stored on a respective device. Thus, if a user comment was sent out, and another user was to view a program at a later time, the comment is inserted in the program where the original user tagged the comment. For example, if the user creating the comment made a reference to a particular scene, when other users view the scene, they are provided with the comment displayed with the scene as the original comment was when it was created.

Figure 7:
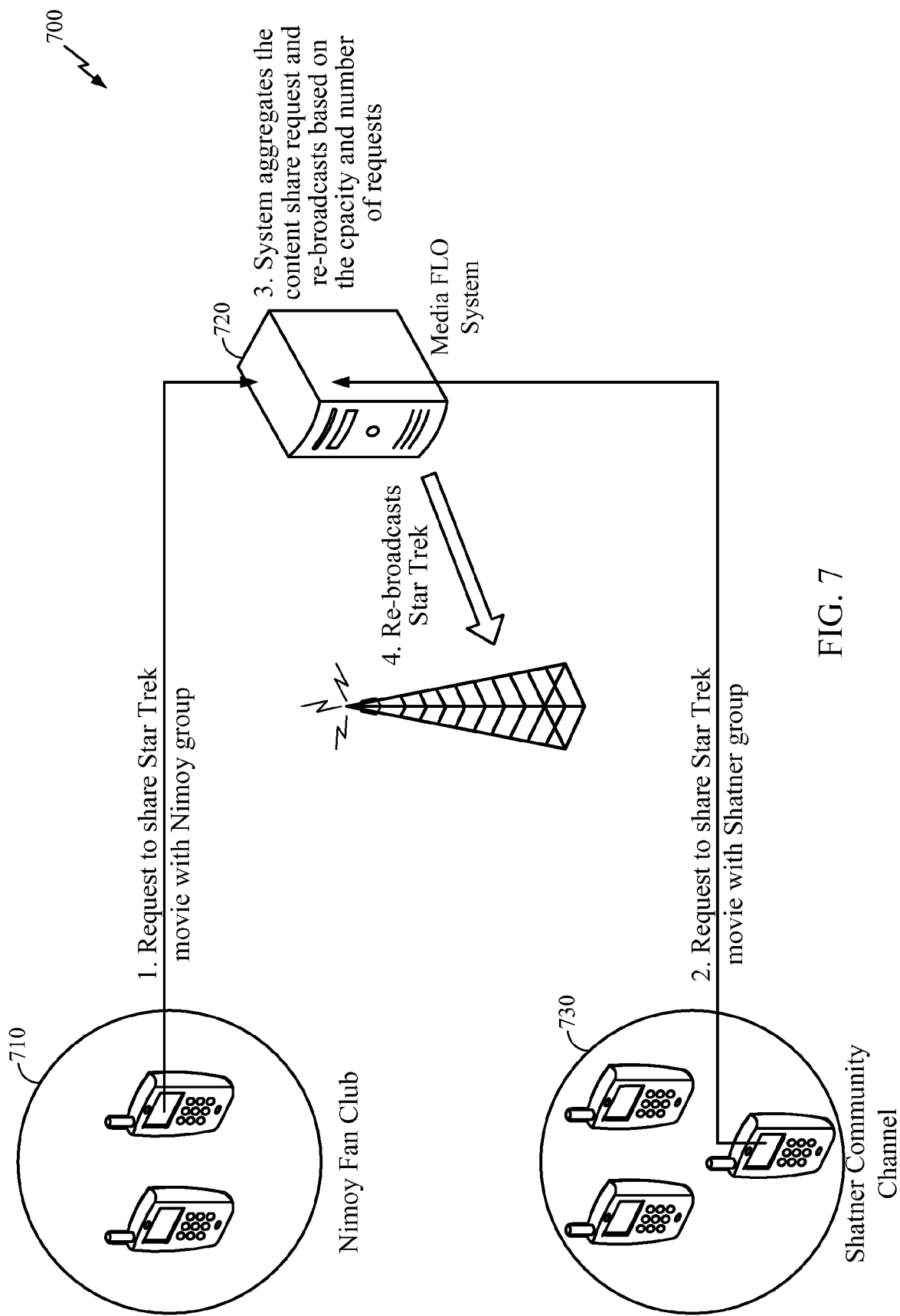
FIG. 7 illustrates an example aggregation system for sharing data between community members.

Referring to FIG. 7, an example aggregation system 700 is used to share data between community members. In this example, a member 710 requests to share content via an aggregator 720. The aggregator 720 collects requests from several members and rebroadcasts the requested content to a community 730, based on the number of requests for example. The rebroadcasts could occur during non peak times of the respective network or during times when less communications activities were detected in the respective network. Although not shown, user generated comments and tags can be transmitted via the aggregator 720.

Figure 8:
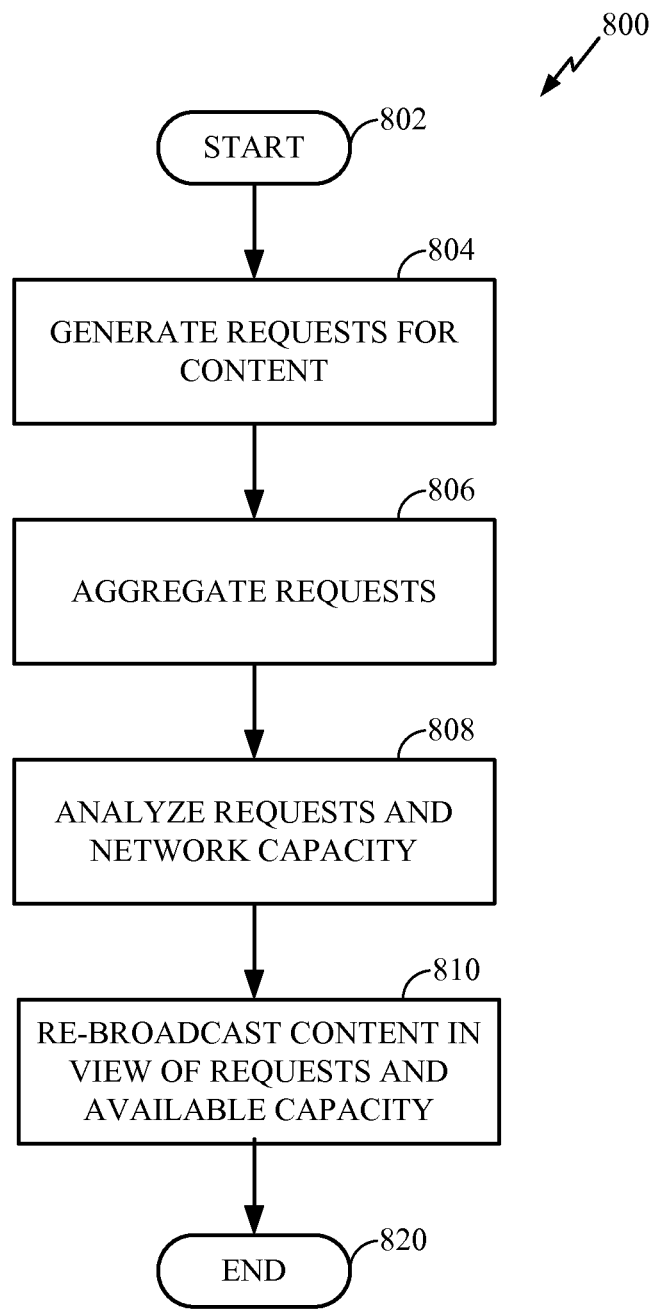
FIGS. 8 and 9 are flow diagrams illustrating methodologies relating to community networks and data sharing.
Figure 9:
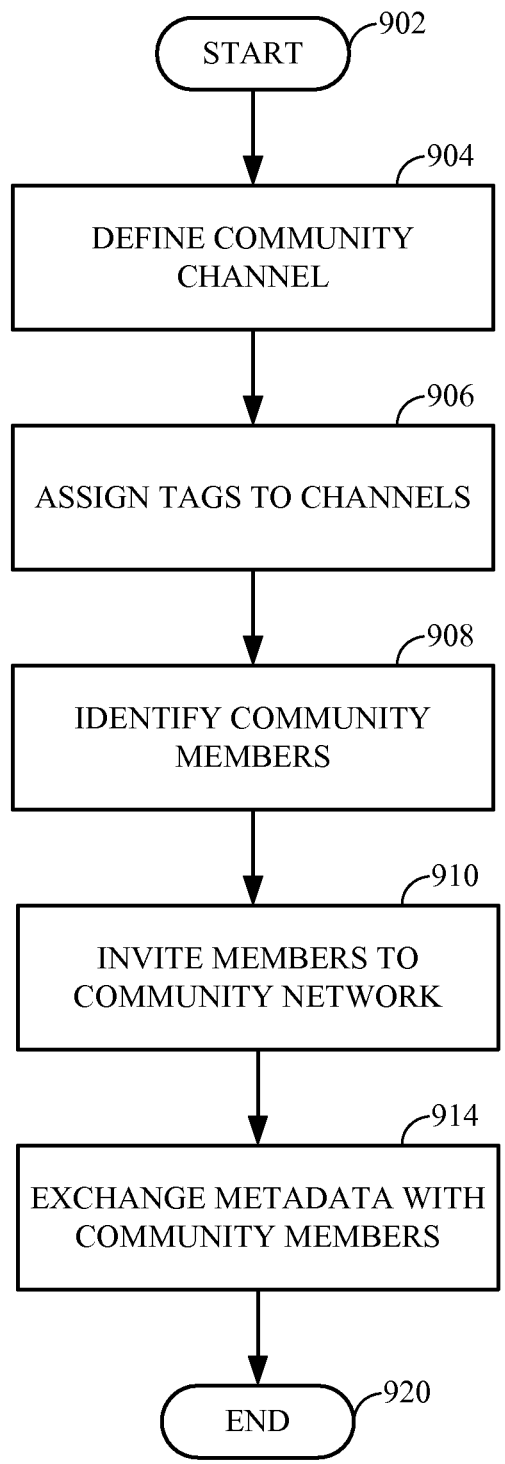

Referring to FIG. 8 and FIG. 9, a methodology 800 and 900 relating to community networks and data sharing is illustrated. While, for purposes of simplicity of explanation, the methodologies are shown and described as a series of acts, it is to be understood and appreciated that the methodology is not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be utilized to implement a methodology in accordance with the claimed subject matter.

Proceeding to step 802 of FIG. 8, the process 800 begins. At step 804, requests are generated by one or more users. Such requests can be requests for desired data content that the users desire to view from one or more broadcast channels. The requests are aggregated at step 806. This can include collecting the requests from a plurality of devices, whereby such collections occur at a server, or across several severs associated with one or more base stations, for example. After the requests have been collected, the process proceeds to perform an analysis step 808. The analysis can include determining if the number of requests has exceeded a pre-defined threshold, for example. Another type of analysis includes examining existing network capacity to determine suitable times during which content may be broadcast, in order to mitigate network loading requirements. After the analysis step 808, a re-broadcasting of the requested data content takes place at step 810. For example, if the number of requests for data content exceeds a threshold and/or network capacity is suitable, a re-broadcast for the requested content can take place. As can be appreciated, other factors may be considered during the rebroadcast such as broadcasting during times to achieve a desired quality of service, signal to noise ratio, or other factor. The process completes at step 820.

In general, the present invention enables a user watching a program to decide to share the program (or comments related thereto) with a community. A user can send the request to include the program to a community channel. The system receives the share requests across all community channel members and decides to re-broadcast the program based on the available capacity on the FLO network and number of requests, for example, where the program (or programs) is re-broadcast at the optimized time.

Now referring to FIG. 9, a methodology 900 illustrates sharing data on a defined community network in accordance with one or more tags. The process 900 begins at step 902. One or more community channels are defined by a respective user at step 904. As shown above, interfaces can be provided to enable creating a network that can be shared with others in a network community. One or more tags are assigned to the defined channels using such interfaces at step 906. This can include metadata information that can be shared amongst end users where the metadata is associated with one or more designated broadcast channels. Members of a community are then identified at step 908. As noted above, interfaces can be provided where members are identified and selected. After identifying the members, the identified members are invited to join a community network at step 910. This can also include user interface functionality that facilitates sending messages to the designated members to provide options for joining the community network. After community network members have been established, data can be exchanged between the members in accordance with a given broadcast at step 914. This data can include member comments, impressions, voting or opinions, or substantially any type of data a member desires to share in accordance with one or more broadcast channels. At step 920, the process ends.

In this process 900, messages are sent to the community in context to the program. Community channel members receive and respond to comments so as to create a discussion thread, for example. Messages can be displayed when community channel members are viewing the relevant program. A FLO system can allow selected online video communities to establish their community channels on the system. Users can subscribe to these community channels. In one embodiment, each day (or other timeframe), filtered content from these online video communities is delivered (clip-casting) to FLO devices, e.g., Top videos of the day, most discussed, most favorites and so forth. Users can also upload their self-produced videos to be considered for the community channel.

Figure 10:
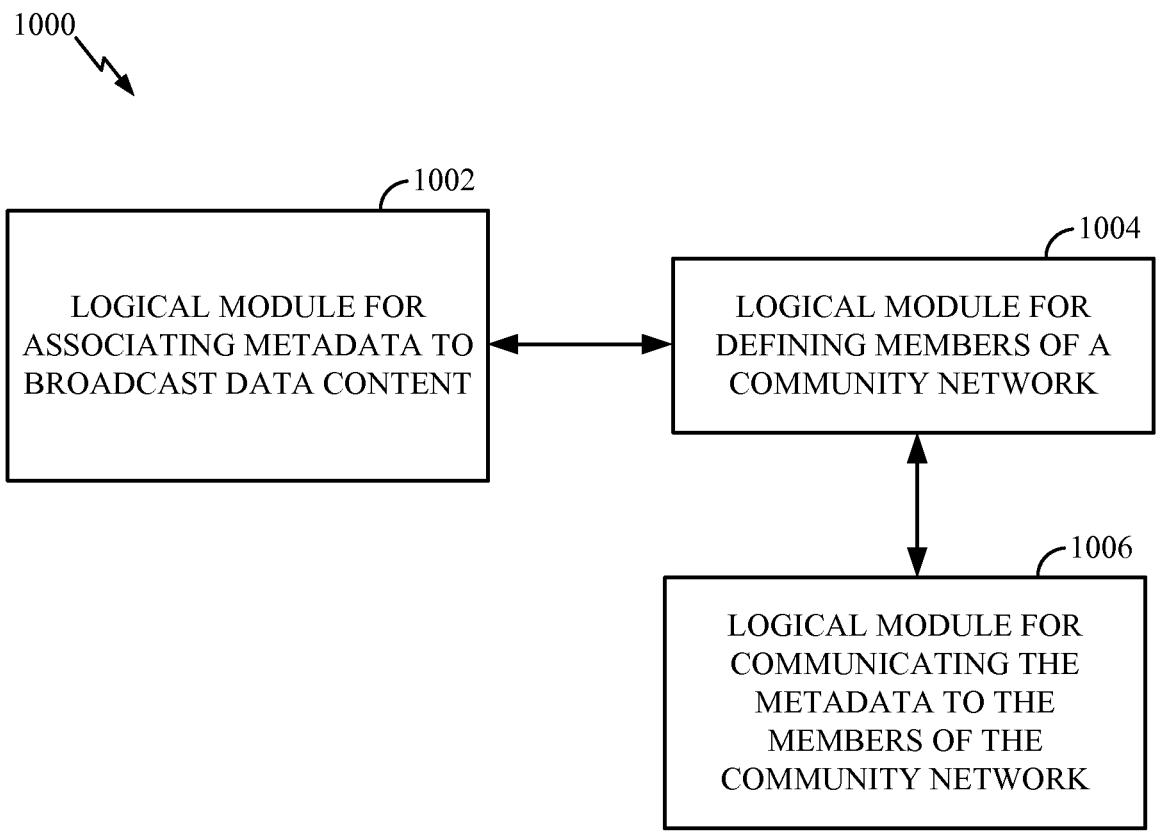
FIGS. 10 and 11 illustrate logical modules for community networks and data sharing.

Now referring to FIG. 10, an exemplary system 1000 that facilitates communications in a community network is shown. The system 1000 can be employed as part of a communications apparatus, for example. The system 1000 includes a logical module 1002 for associating metadata to broadcast data content. A logical module 1004 for defining members of a community network is provided along with a logical module 1006 for communicating the metadata to the members of the community network.

Figure 11:
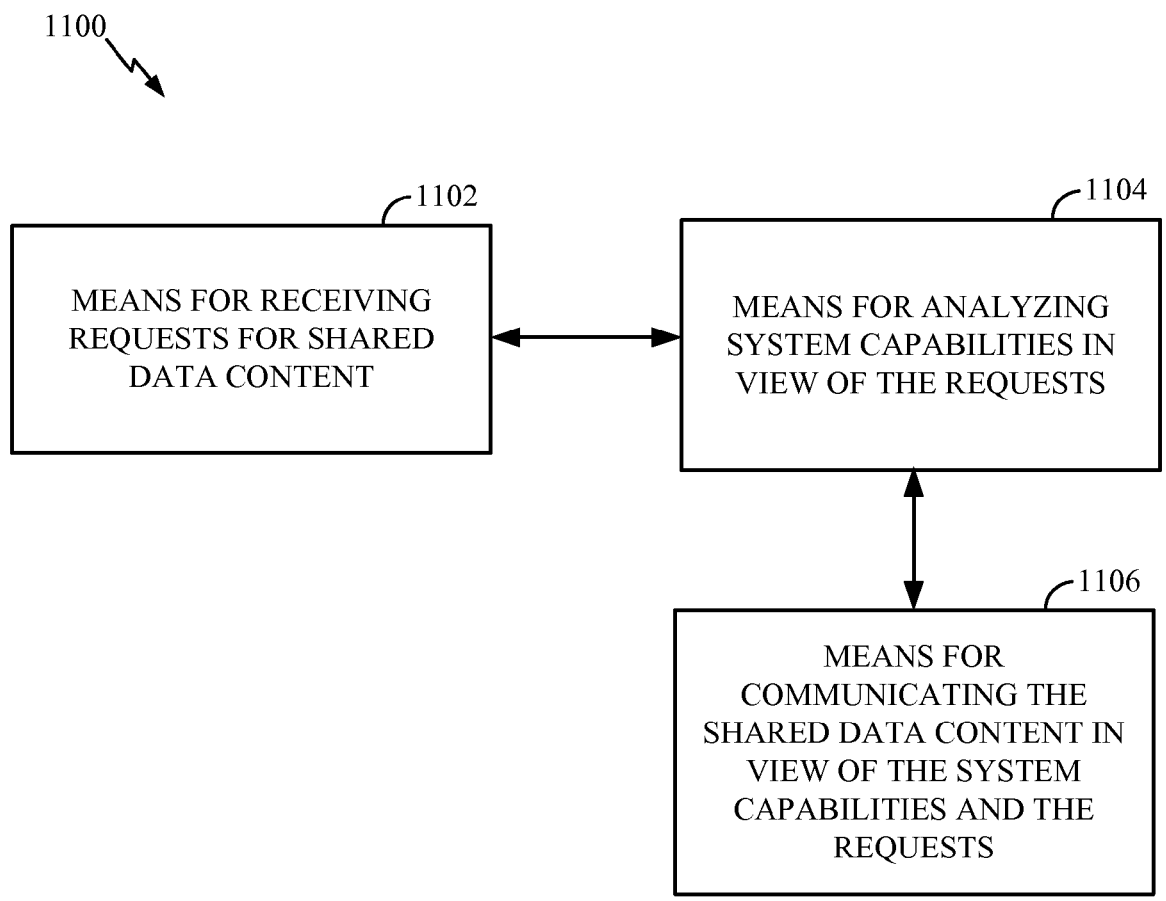

Referring to FIG. 11, a second exemplary system 1100 that facilitates communications in a community network is shown. The system 1100 can be employed as part of as communications apparatus. The system 110 includes a logical module 1102 for receiving requests for shared data content and a logical module 1104 for analyzing system capabilities in view of the requests. A logical module 1106 is provided for communicating the shared data content in view of the system capabilities and the requests.

Figure 12:
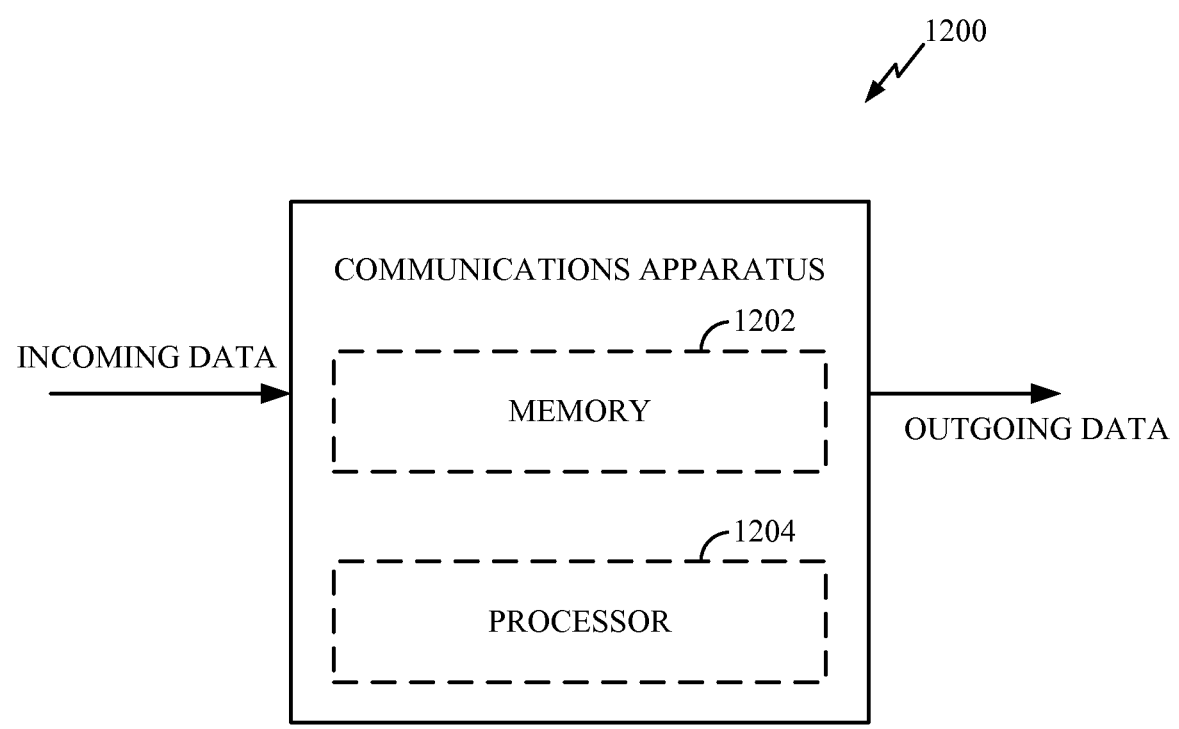
FIG. 12 is a representative diagram illustrating an apparatus for community networks and data sharing.

FIG. 12 illustrates a communications apparatus 1200 that can be employed for community networks of the invention. The apparatus includes a memory 1202 for storing instructions and a processor 1204 for executing the instructions. Some of the instructions include generating requests for shared data, where the requests are employed to initiate a broadcast of the shared data, based at least in part on a number of requests or broadcast capacity. In another case, the instructions are employed for receiving requests for shared data, where the requests are aggregated and employed to initiate a broadcast of the shared data based at least in part on the number of requests. In yet another example, the instructions process tag components received in accordance with one or more broadcast channels, where the tags are employed to communicate with other members of a community network formed from the broadcast channels. Another example includes instructions to tag components of one or more broadcast channels, where the tags are employed to communicate with other members of a community network formed from the broadcast channels.

Figure 13:
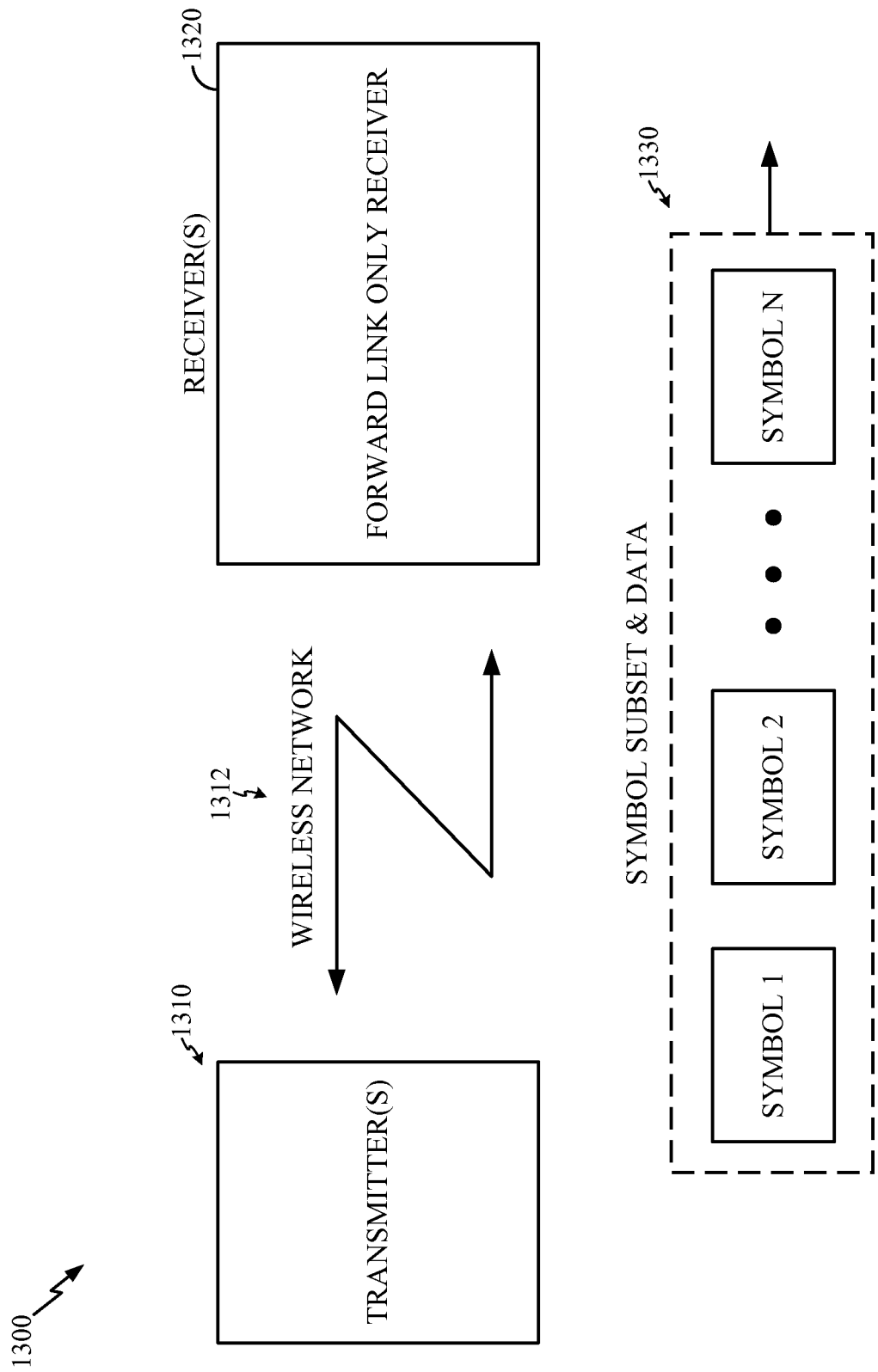
FIG. 13 is a schematic block diagram illustrating an example wireless network.

FIG. 13 illustrates a network system 1300 for a forward link only network employed in the system of the present invention. The network system 1300 includes one or more transmitters 1310 that communicate across a wireless network 1312 to one or more receivers 1320. The receivers 1320 can include substantially any type of communicating device such as a cell phone, computer, personal assistant, hand held or laptop devices, and so forth. Portions of the receiver 1320 are employed to decode a symbol subset 1330 and other data such as multimedia data. In one embodiment, the symbol subset 1330 is generally transmitted in an Orthogonal Frequency Division Multiplexing (OFDM) network that employs forward link only (FLO) protocols for multimedia data transfer. In this embodiment, channel estimation is generally based on uniformly spaced pilot tones inserted in the frequency domain, and in respective OFDM symbols. Preferably, the pilots are spaced 8 carriers apart, and the number of pilot carriers is set at 512.

Figure 14:
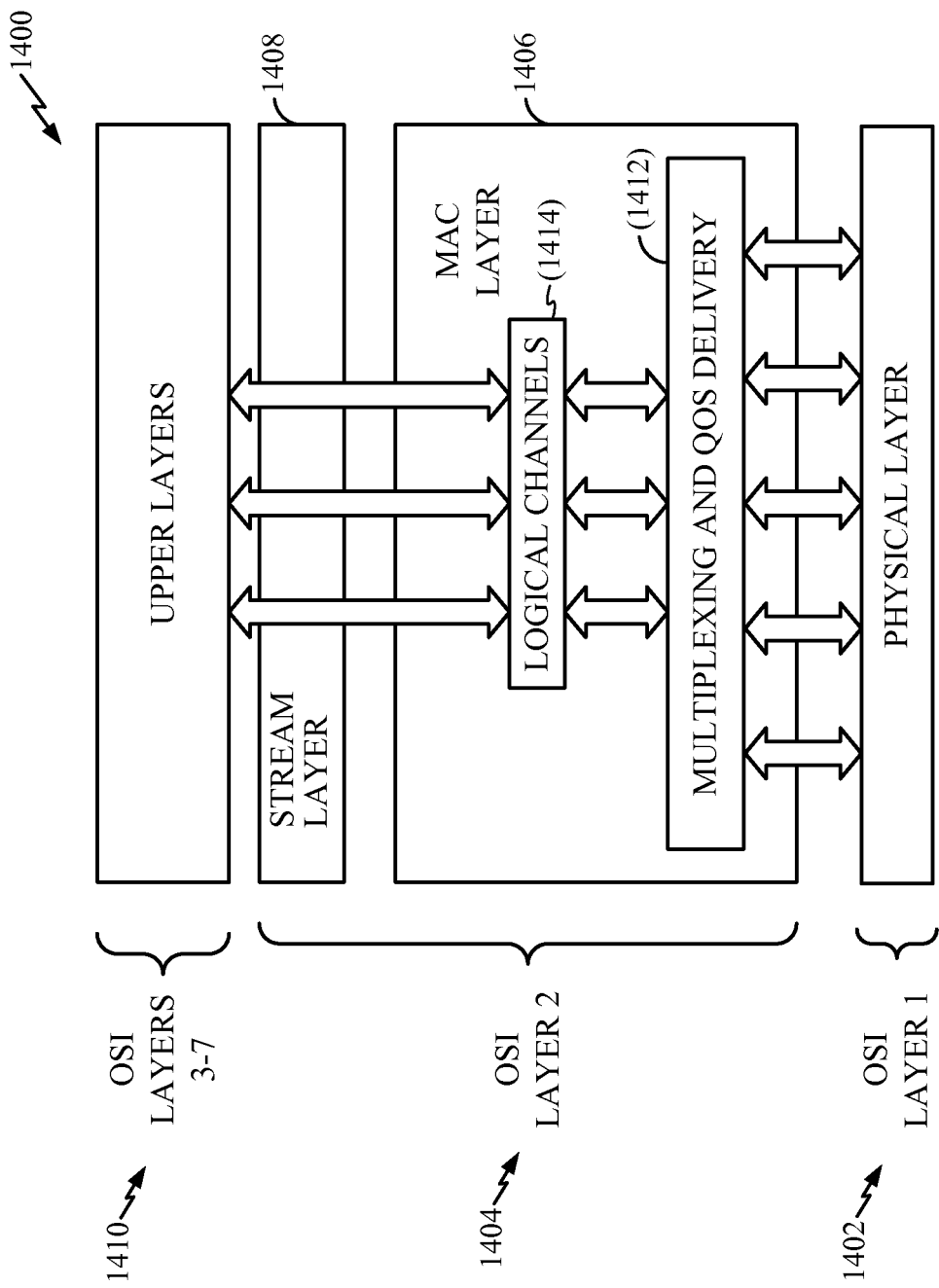
FIG. 14 is a diagram illustrating example network layers for a wireless system.

FIG. 14 illustrates example network layers 1400 for a wireless system where data received therefrom is employed in the frequency blocks described above. A FLO air interface protocol reference model is shown in FIG. 14. Generally, the FLO air interface specification covers protocols and services corresponding to Open Systems Interconnect (OSI) networking model having Layers 1 (physical layer) 1402 and Layer 2 (Data Link layer) 1404. The Data Link layer is further subdivided into two sub-layers, namely, Medium Access (MAC) sub-layer 1406, and Stream sub-layer 1408. Upper Layers 1410 include OSI layers 3-7 and can include compression of multimedia content, access control to multimedia, along with content and formatting of control information. The MAC layer 1406 includes multiplexing and Quality of Service (QoS) delivery functions 1412. The MAC layer 1406 also includes logical channels 1414.

The FLO air interface specification typically does not specify the upper layers to allow for design flexibility in support of various applications and services. These layers are shown to provide context. The Stream Layer includes multiplexes up to three upper layer flows into one logical channel, binding of upper layer packets to streams for each logical channel, and provides packetization and residual error handling functions. Features of the Medium Access Control (MAC) Layer 1406 include controlling access to the physical layer, performing the mapping between logical channels and physical channels, multiplexing logical channels for transmission over the physical channel, de-multiplexing logical channels at the mobile device, and/or enforcing Quality of Service (QOS) requirements. Features of Physical Layer include providing channel structure for the forward link, and defining frequency, modulation, and encoding requirements In general, FLO technology utilizes Orthogonal Frequency Division Multiplexing (OFDM), which is also utilized by Digital Audio Broadcasting (DAB), Terrestrial Digital Video Broadcasting (DVB-T), and Terrestrial Integrated Services Digital Broadcasting (ISDB-T). Generally, OFDM technology can achieve high spectral efficiency while effectively meeting mobility requirements in a large cell SFN. Also, OFDM can handle long delays from multiple transmitters with a suitable length of cyclic prefix; a guard interval added to the front of the symbol (which is a copy of the last portion of the data symbol) to facilitate orthogonality and mitigate inter-carrier interference. As long as the length of this interval is greater than the maximum channel delay, reflections of previous symbols are removed and the orthogonality is preserved.

Figure 15:
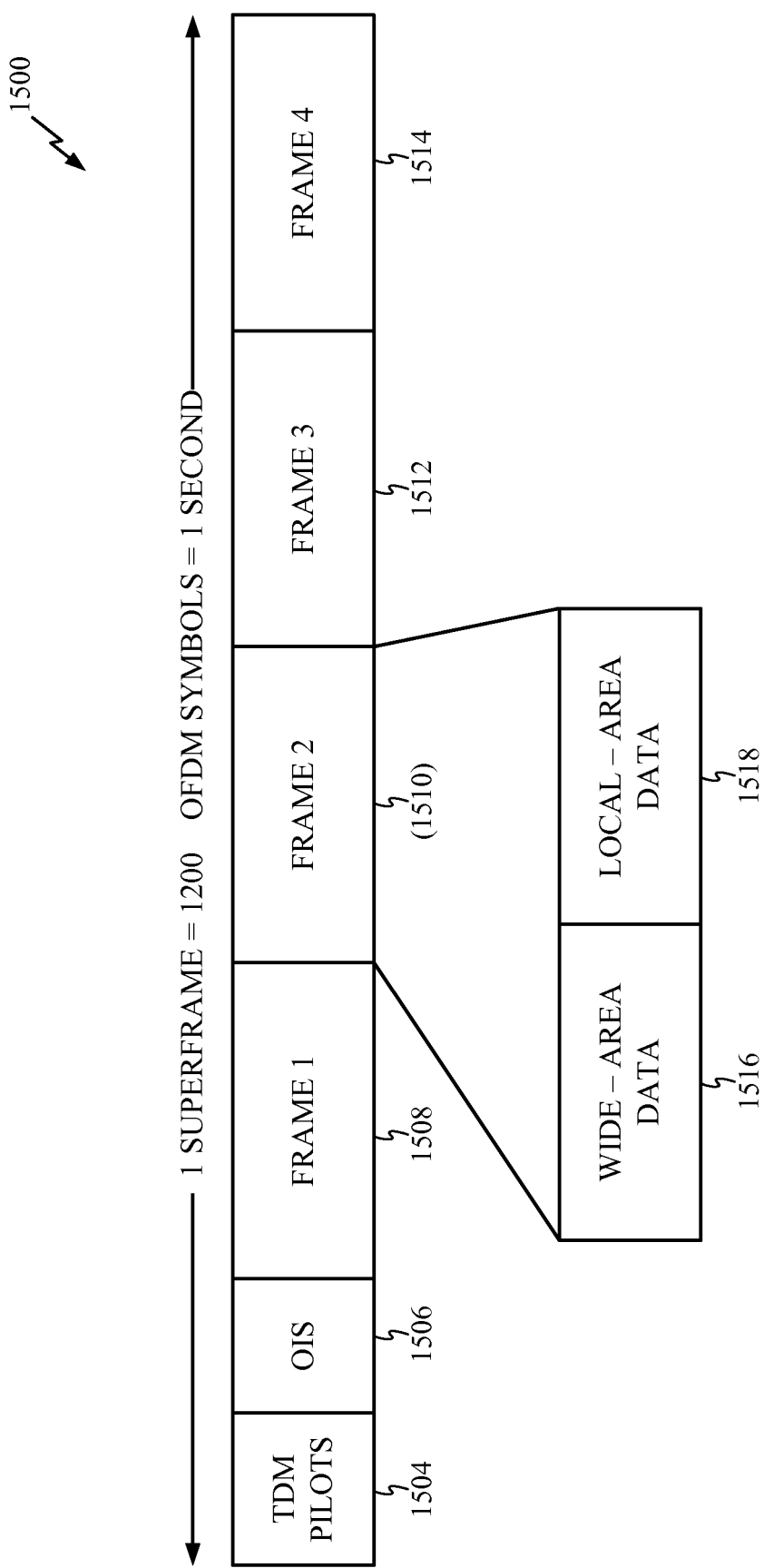
FIG. 15 is a diagram illustrating an example data structure and signal for a wireless system.

Proceeding to FIG. 15, an exemplary FLO physical layer superframe 1500 is illustrated. In an embodiment, a superframe is equal to 1200 OFDM symbols with a one second time duration. The FLO physical layer uses a 4K mode (yielding a transform size of 4096 sub-carriers), providing superior mobile performance compared to an 8K mode, while retaining a sufficiently long guard interval that is useful in fairly large SFN cells. Rapid channel acquisition can be achieved through an optimized pilot and interleaver structure design. The interleaving schemes incorporated in the FLO air interface facilitate time diversity. The pilot structure and interleaver designs optimize channel utilization without annoying the user with long acquisition times. Generally, FLO transmitted signals are organized into superframes as illustrated at 1500. Each superframe is comprised of four frames of data, including TDM pilots (Time Division Multiplexed) 1504, Overhead Information Symbols (OIS) 1506 and frames 1508, 1510, 1512, 1514, containing wide-area 1516 and local-area data 1518. The TDM pilots are provided to allow for rapid acquisition of the OIS. The OIS describes the location of the data for each media service in the super frame.

Typically, each superframe consists of 200 OFDM symbols per MHz of allocated bandwidth (1200 symbols for 6 MHz), and each symbol contains 7 interlaces of active sub-carriers. Each interlace is uniformly distributed in frequency, so that it achieves the full frequency diversity within the available bandwidth. These interlaces are assigned to logical channels that vary in terms of duration and number of actual interlaces used. This provides flexibility in the time diversity achieved by any given data source. Lower data rate channels can be assigned fewer interlaces to improve time diversity, while higher data rate channels utilize more interlaces to minimize the radio's on-time and reduce power consumption.

The acquisition time for both low and high data rate channels is generally the same. Thus, frequency and time diversity can be maintained without compromising acquisition time. Most often, FLO logical channels are used to carry real-time (live streaming) content at variable rates to obtain statistical multiplexing gains possible with variable rate codecs (Compressor and Decompressor in one). Each logical channel can have different coding rates and modulation to support various reliability and quality of service requirements for different applications. The FLO multiplexing scheme enables device receivers to demodulate the content of the single logical channel it is interested in to minimize power consumption. Mobile devices can demodulate multiple logical channels concurrently to enable video and associated audio to be sent on different channels.

Error correction and coding techniques can also be employed in this embodiment. Generally, FLO incorporates a turbo inner code 13 and a Reed Solomon (RS) 14 outer code. Typically, the turbo code packet contains a Cyclic Redundancy Check (CRC). The RS code need not be calculated for data that is correctly received, which, under favorable signal conditions, results in additional power savings. Another aspect is that the FLO air interface is designed to support frequency bandwidths of 5, 6, 7, and 8 MHz. A highly desirable service offering can be achieved with a single Radio Frequency channel.

Figure 16:
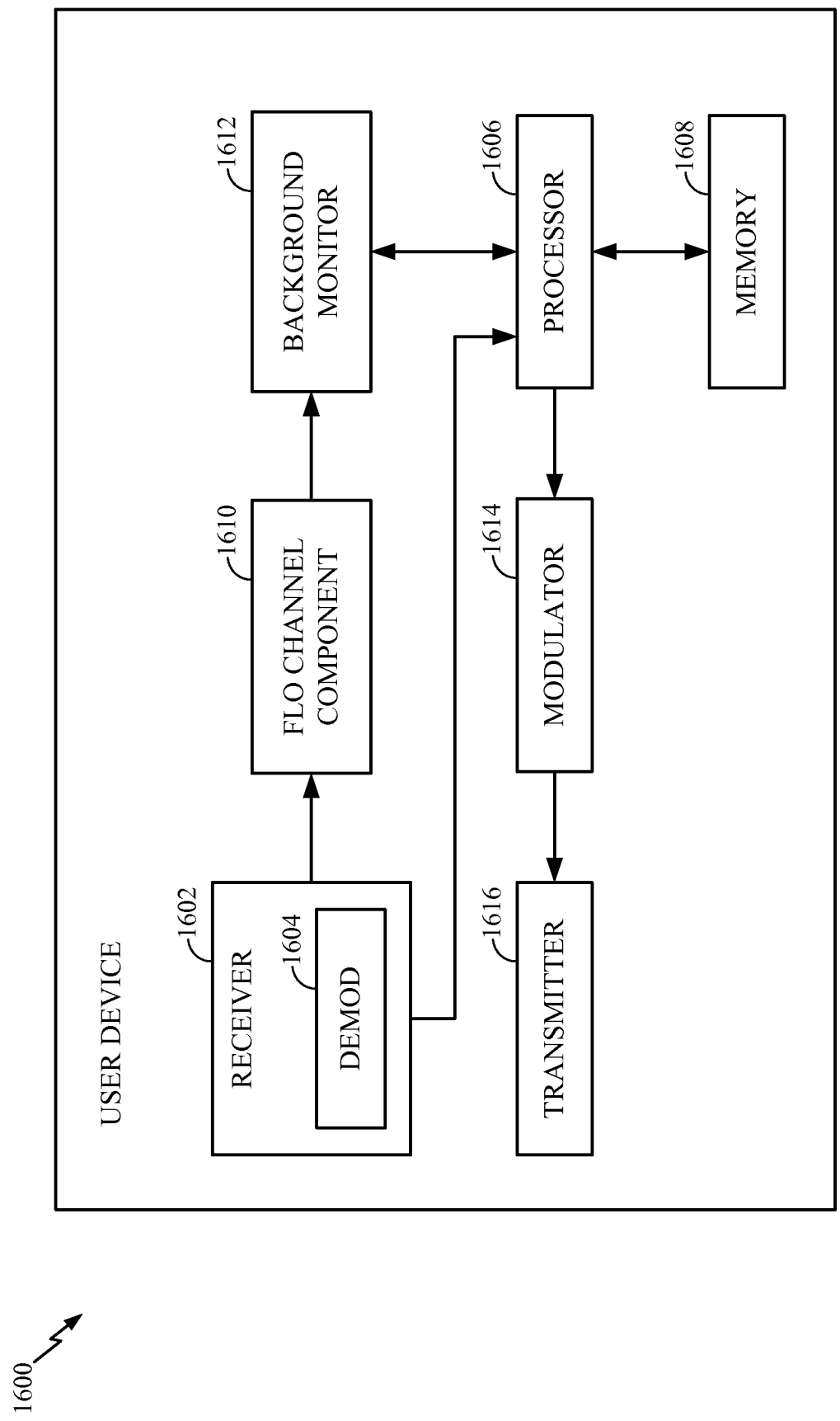
FIG. 16 is a diagram illustrating an example user device for a wireless system.

FIG. 16 is an illustration of a user device 1600 that is employed in a wireless communication environment, in accordance with one or more aspects set forth herein. User device 1600 comprises a receiver 1602 that receives a signal from, for instance, a receive antenna (not shown), and performs typical actions thereon (e.g., filters, amplifies, down converts, etc.) and digitizes the conditioned signal to obtain samples. Receiver 1602 can be a non-linear receiver. A demodulator 1604 can demodulate and provide received pilot symbols to a processor 1606 for channel estimation. A FLO channel component 1610 is provided to process FLO signals as previously described. This can include digital stream processing and/or positioning location calculations among other processes. The processor 1606 can be a processor dedicated to analyzing information received by receiver 1602 and/or generating information for transmission by a transmitter 1616, a processor that controls one or more components of user device 1600, and/or a processor that both analyzes information received by receiver 1602, generates information for transmission by the transmitter 1616, and controls one or more components of the user device 1600.

The user device 1600 can additionally comprise memory 1608 that is operatively coupled to processor 1606 and that stores information related to wireless network data processing. It will be appreciated that the data store (e.g., memories) components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 1608 of the subject systems and methods is intended to comprise, without being limited to, these and any other suitable types of memory. User device 1600 further comprises a background monitor 1614 for processing FLO data, a symbol modulator 1614 and a transmitter 1616 that transmits the modulated signal.

Figure 17:
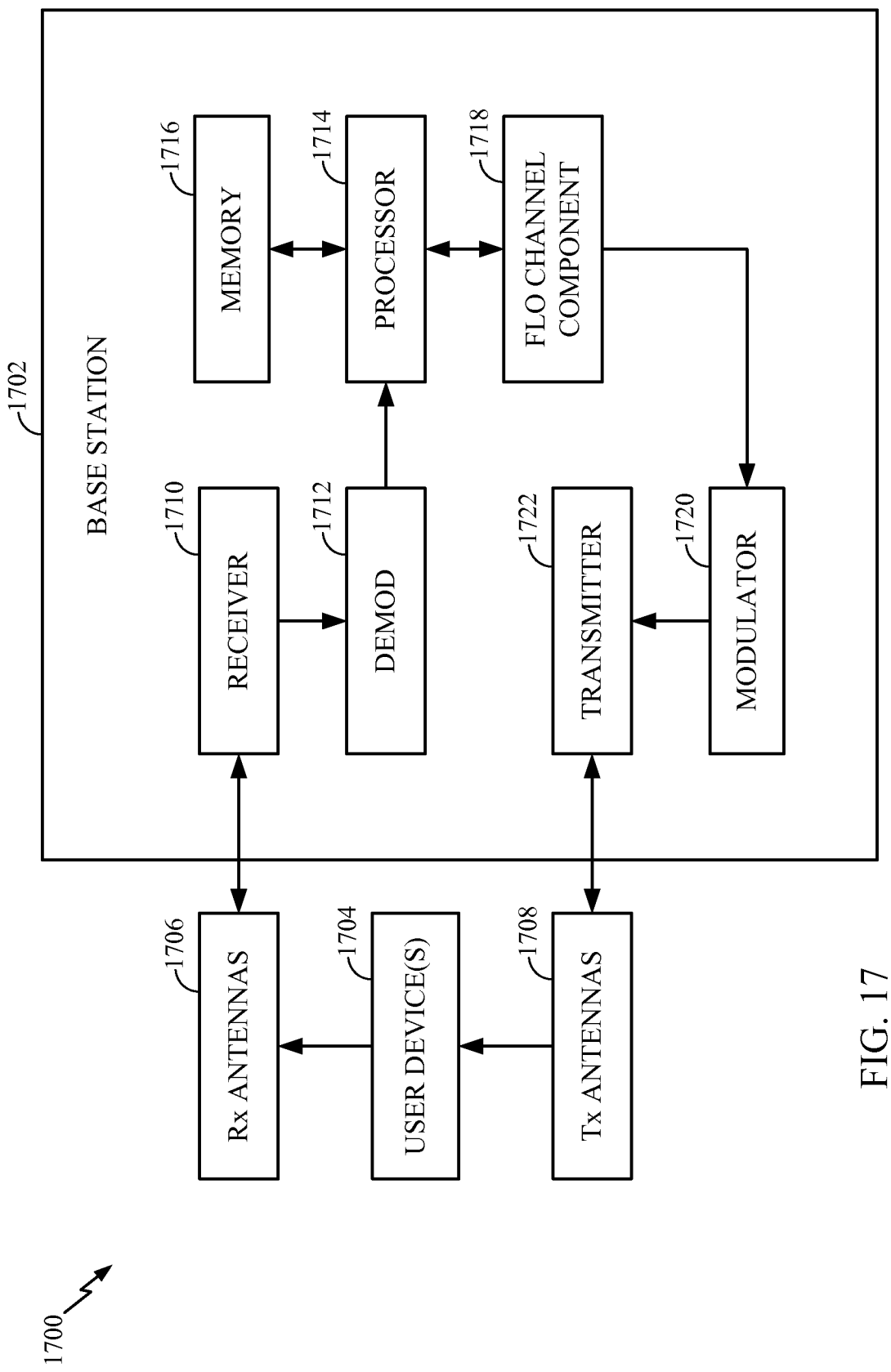
FIG. 17 is a diagram illustrating an example base station for a wireless system.

FIG. 17 illustrates an example system 1700 that comprises a base station 1702 with a receiver 1710 that receives signal(s) from one or more user devices 1704 through a plurality of receive antennas 1706, and a transmitter 1724 that transmits to the one or more user devices 1704 through a transmit antenna 1708. Receiver 1710 can receive information from receive antennas 1706 and is operatively associated with a demodulator 1712 that demodulates received information. Demodulated symbols are analyzed by a processor 1714 that is similar to the processor described above, and which is coupled to a memory 1716 that stores information related to wireless data processing. Processor 1714 is further coupled to a FLO channel 1718 component that facilitates processing FLO information associated with one or more respective user devices 1704.

A modulator 1722 can multiplex a signal for transmission by a transmitter 1724 through transmit antenna 1708 to user devices 1704. FLO channel component 1718 can append information to a signal related to an updated data stream for a given transmission stream for communication with a user device 1704, which can be transmitted to user device 1704 to provide an indication that a new optimum channel has been identified and acknowledged.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for sharing data content of a community channel over a broadcast network, comprising:
    defining the community channel based upon one or more tags used to filter data content of one or more available broadcast channels;
    receiving a comment from at least one member of the community channel regarding the data content and referencing a scene of the data content;
    aggregating requests to receive data content associated with the one or more tags across the broadcast network, wherein the requests to receive are received from less than all of a plurality of members of the community channel; and
    analyzing system capacity requirements to determine a re-broadcasting time by determining a time during which loading on the broadcast network is reduced;
    re-broadcasting the requested data content over the broadcast network at the determined re-broadcasting time to each of the plurality of members of the community channel based at least in part on the number of requests and irrespective of whether each of the plurality of members requested the data content, wherein the re-broadcasted data content comprises the received comment located at the referenced scene.

2. The method of claim 1, wherein the data content is associated with video, audio, image, or textual data.

3. The method of claim 1, wherein said re-broadcasting is in response to comparing the number of requests to a designated threshold.

4. The method of claim 1, further comprising sharing data content with the community channel by sending requests to a media distribution system.

5. The method of claim 4, wherein the media distribution system is associated with an orthogonal frequency-division multiplexing (OFDM) network.

6. The method of claim 4, further comprising utilizing residual bandwidth as a result of a statistic multiplexer gain to determine broadcast times.

7. The method of claim 4, further comprising listing a shared program on a program guide of community channel members.

8. The system of claim 1, wherein analyzing system capacity is by reference to quality of service or signal to noise ratio analysis.

9. A communications apparatus, comprising:
   means for defining a community channel based upon one or more tags used to filter data content of one or more available broadcast channels of a broadcast network;
   means for receiving a comment from at least one member of the community channel regarding the data content and referencing a scene of the data content;
   means for aggregating requests to receive data content associated with the one or more tags, wherein the requests to receive are received from less than all of a plurality of members of the community channel;
   means for analyzing system capacity requirements to determine a re-broadcasting time by determining a time during which loading on the broadcast network is reduced; and
   means for re-broadcasting the requested data content over a broadcast network at the determined time to members of the community channel based at least in part on the number of requests and irrespective of whether the members requested the data content, wherein the re-broadcasted data content comprises the received comment located at the referenced scene.

10. A non-transitory machine-readable medium having stored thereon machine-executable instructions for:
    defining a community channel based upon one or more tags used to filter data content of one or more available broadcast channels of a broadcast network;
    receiving a comment from at least one member of the community channel regarding the data content and referencing a scene of the data content;
    aggregating one or more requests to receive data from one or more members of the community channel associated with the one or more tags to the other members of the community channel, wherein the requests to receive are received from less than all of a plurality of members of the community channel;
    analyzing system capacity requirements to determine a re-broadcasting time by determining a time during which loading on the broadcast network is reduced; and
    re-broadcasting the requested data content over a broadcast network at the determined time to each of the plurality the members of the community channel based at least in part on the number of requests and irrespective of whether each of the plurality of members requested the data content, wherein the re-broadcasted data content comprises the received comment located at the referenced scene.

11. The non-transitory machine-readable medium of claim 10, further comprising communicating the shared data content when system loading requirements are below a given threshold.

* * * * *